2,894,039
PROCESS FOR THE PRODUCTION OF BIS(CHLOROMETHYL)DISULPHIDE

Maurice Joullie, Saint-Germain-en-Laye, Michel Laurre, Chatillon-sous-Bagneux, Gabriel Maillard, Puteaux, and Pierre Muller, Paris, France, assignors to Recherches et Propagande Scientifiques (Societe a Responsabilite Limitee), Paris, France, a company of France No Drawing. Application June 4, 1957
Serial No. 663,361

12 Claims. (Cl. 260—608)

This invention is for improvements in or relating to the production of bis(chloromethyl) disulphide.

Bis(chloromethyl) disulphide has previously been prepared by various different processes but none has been used on a commercial scale either because of the complicated nature and expense of the process or because of the low yield of disulphide obtainable.

One method for preparing the aforesaid disulphide is first to prepare dimethyl disulphide in accordance with the reaction scheme (H. Brintzinger et al., Berichte, 1952, 85, 455–57):

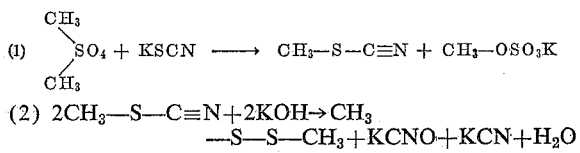

(2) $2CH_3—S—C{\equiv}N + 2KOH \rightarrow CH_3—S—S—CH_3 + KCNO + KCN + H_2O$ then to convert the dimethyl disulphide into methanesulphenyl chloride by the action of chlorine at a temperature of $-20$ to $-15°$ C. with or without a solvent such as tetrachloroethane (Brintzinger et al., Berichte, 1950, 83, 87–90) as in the equation:

(3) $\qquad CH_3—S—S—CH_3 + Cl_2 \rightarrow 2CH_3SCl$ thereafter to treat the methanesulphenyl chloride with chlorine or sulfuryl chloride at $0°$ C. to convert it into chloromethanesulphenyl chloride:

(4) $\qquad CH_3—S—Cl + Cl_2 \rightarrow ClCH_2—SCl + HCl$ and finally to convert the chloromethanesulphenyl chloride into bis(chloromethyl) disulphide (Brintzinger et al., Berichte, 1954, 87, 314) by the action of mercury or by the action of potassium iodide with stirring for several hours.

The chloromethanesulphenyl chloride employed in the aforementioned process may also be obtained in a single stage by the action of a halogenation agent on s-trithiane in methylene chloride at $20-25°$ C. (J. Org. Chem., 1950, 15, 795).

From chloromethanesulphenyl chloride Douglass et al. (J. Org. Chem., 1951, 16, 1301) obtained bis(chloromethyl)disulphide in a yield of 11% by reacting the chloride in dichloromethane with thiophenol.

Bis(chloromethyl) disulphide has also been obtained by the action of thionyl chloride ($SOCl_2$), sulphuryl chloride ($SO_2Cl_2$) and sulphur monochloride ($S_2Cl_2$) on s-trithiane in suspension in chloroform, but the yields of the desired disulphide are extremely small (of the order 4 to 8%).

The method of preparing bis(chloromethyl) disulphide from trithiane was first referred to by Bloch and Höhn (Berichte, 1922, 55, 54) and then by Davies and Hambly (Austr. J. of Chem., 1953, 6, 152–155). The latter authors, who reacted sulphur monochloride in the hot state with trithiane without a solvent, describe the disulphide as being present in the distillation tails of the bis(chloromethyl) monosulphide produced. They indicate a yield of 4.4% of bis(chloromethyl) disulphide and 54.8% of bis(chloromethyl) monosulphide.

According to the present invention, it has now been found that from s-trithiane and sulphur monochloride or, less preferably, sulphuryl chloride it is possible to obtain bis(chloromethyl) disulphide in good yields and without any violent reaction provided that to the reaction mixture there is added a significant quantity of bis(chloromethyl) monosulphide.

This result could neither be foreseen on the basis of the theory advanced by Bloch and Höhn, who suggested that the reaction proceeds in the following manner:

nor on the basis of the equation:

proposed by Davies and Hambly. In fact, it has been found that the reaction is very complex since there may be formed simultaneously carbon disulphide, hydrochloric acid, sulphur, bis(chloromethyl) monosulphide, bis(chloromethyl) disulphide, chloromethanesulphenyl chloride and tars. It has even been found that it is possible to obtain the disulphide from the monosulphide by prolonged boiling in the presence of sulphur.

According to the present invention, therefore, a process for the production of bis(chloromethyl) disulphide by reacting s-trithiane with sulphur monochloride or sulphuryl chloride is characterised by the deliberate addition to the reaction mixture of bis(chloromethyl) monosulphide. Preferably, such addition is effected before reaction commences.

It is expedient to use the trithiane and sulphur monochloride in molecular proportions substantially in the ratio of 2:3 and to add one of the reactants gradually to a mixture of the other and bis(chloromethyl) monosulphide at a temperature in the region of $140-160°$ C.

From the industrial point of view, both as regard convenience of operation and to obtain a high yield, it is preferred to dissolve the trithiane in bis(chloromethyl) monosulphide, to heat the solution obtained to $140-160°$ C. and gradually to introduce the sulphur monochloride. Yields obtainable in this way are of the order of 70%.

When the trithiane is added gradually to a mixture of sulphur monochloride and bis(chloromethyl) monosulphide, the highest yields (of the order of 60%) of bis(chloromethyl) disulphide are obtained when the trithiane is added over a period of approximately 15 minutes to a boiling mixture (temperature about $145°$ C.) of sulphur monochloride and bis(chloromethyl) monosulphide in molecular proportions in the ratio of about 3:20 and the temperature is kept at about $145°$ C. for at least 15 minutes after introduction of the trithiane, and preferably for about 1 hour.

Generally speaking, satisfactory yields (higher than 25%) are obtained when trithiane is added gradually to a boiling mixture of sulphur monochloride and bis(chloromethyl)monosulphide if (a) the molecular proportions of sulphur monochloride and bis(chloromethyl) monosulphide are in the ratios from 3:5 to 3:20, and preferably from 3:10 to 3:20, (b) the time taken for the addition of the trithiane is from 7 to 45 minutes, or (c) heating at a temperature of about $145°$ C. is continued for up to 3 hours after the addition of trithiane.

According to a feature of the invention, the trithiane is added in portions, as such or in solution in bis(chloromethyl) monosulphide, to the mixture of bis(chloromethyl) monosulphide and sulphur monochloride at its boiling point ($145°$ C.), or at a temperature close to the boiling point, using molecular proportions of trithiane and sulphur monochloride substantially in the ratio 2:3, When the reaction is terminated, the reaction mixture is distilled under reduced pressure to recover first the bis-chloromethyl) monosulphide and then the bis(chloromethyl) disulphide.

The process according to the invention offers the advantages over the known similar processes in that (a) it can be carried out with starting materials which are readily accessible (trithiane being obtainable in excellent yields from formaldehyde, hydrochloric acid and hydrogen sulphide), (b) it leads to yields much higher than those previously obtained, and (c) it provides a small quantity of bis(chloromethyl) monosulphide as a by-product so that losses of the solvent employed are compensated.

It is, moreover, not necessary for the trithiane to be absolutely dry; the reaction does not become violent whereas there is a danger of this happening when using the technique of Bloch and Höhn or that of Davies and Hambly with trithiane which is not absolutely dry. If the trithiane contains a little water when carrying out the process of the invention, it is only necessary to allow for the fact that part of the sulphur monochloride is consumed by way of reaction with the water.

The reaction probably proceeds according to the equation:

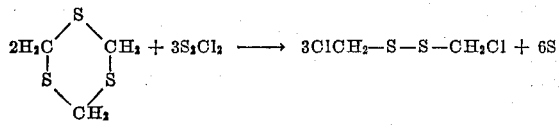

It is possible to recover liberated sulphur for use in the formation of sulphur monochloride.

The foregoing process details have been given, for convenience, with respect to the use of sulphur monochloride only. They are equally applicable to the reaction of trithiane with sulphuryl chloride.

The following examples show how the invention may be put into practice.

*Example I*

Bis(chloromethyl) monosulphide (1310 g.: 10 moles) is placed with sulphur monochloride (202 g.: 1.5 moles) in a flask and the mixture is brought to a temperature of 145° C. by means of an oil bath adjusted to 150° C. Trithiane (138 g.: 1 mole) is introduced in portions during a period of 15 minutes. The mixture is then kept for 1 hour at 145° C. and then distilled under reduced pressure (12.5 mm. Hg). All the bis(chloromethyl) monosulphide is recovered, and 150 g. of bis(chloromethyl) disulphide are obtained (a yield of 60%). The boiling point of the disulphide is 93–94° C. at a pressure of 12.5 mm. Hg.

*Analysis.*—C percent calculated 14.73, C percent found 14.67; 14.87. H percent calculated 2.47, H percent found 2.44; 2.54.

The monosulphide which is recovered can be used again without being purified.

*Example II*

Bis(chloromethyl) monosulphide (1310 g.: 10 moles) is placed with trithiane (138 g.: 1 mole) in a flask equipped with a stirrer extending through a fluid-tight joint, a reflux condenser and a dropping funnel. The mixture is brought to 145° C. by means of an oil bath and then, while stirring, sulphur monochloride (202 g.: 1.5 moles) is slowly added over a period of 15 minutes, the temperature not being allowed to exceed 145° C. The mixture is then kept for 30 minutes at 145° C. and thereafter distilled under reduced pressure (12.5 mm. Hg).

The yield of bis(chloromethyl) disulphide obtained is 72%.

By replacing the sulphur monochloride employed in the preceding examples by an equivalent amount of sulphuryl chloride satisfactory yields are also obtainable.

*Example III*

Trithiane (138 g.: 1 mole) is placed with bis(chloromethyl) monosulphide (655 g.: 5 moles) in a flask equipped with a stirrer, a reflux condenser and a dropping funnel and the mixture is brought to 140° C. By means of the dropping funnel, the end of which opens at the bottom of the flask, sulphuryl chloride (202 g.: 1.5 moles) is introduced over a period of 20 minutes, and the temperature is kept at 140° C. for one hour. The sulphuryl chloride is then driven off under a pressure of 20 mm. Hg, and the mixture is distilled initially without fractionation. The product is then rectified in vacuo with a 45 cm. Vigreux column.

There are thus obtained 57 g. of bis(chloromethyl) disulphide, which corresponds to a yield of 22.8%.

The preceding example shows that even when employing only 5 moles of bis(chloromethyl) monosulphide, which is not the quantity to give the best yields, bis(chloromethyl) disulphide is obtainable in a yield much higher than those obtained from trithiane when working according to known techniques.

We claim:

1. In a process for the production of bis(chloromethyl) disulphide from s-trithiane and a member of the class consisting of sulphur monochloride and sulphuryl chloride, the improvement which consists in the step of adding to the reaction mixture bis(chloromethyl) monosulphide.

2. Process for the production of bis(chloromethyl)disulphide which comprises reacting s-trithiane with a member of the class consisting of sulphur monochloride and sulphuryl chloride in molecular proportions substantially in the ratio 2:3, one of the reactants being added gradually to a mixture of the other and bis(chloromethyl) monosulphide at a temperature of about 140 to 160° C.

3. Process according to claim 2 wherein the chloride reactant and bis(chloromethyl) monosulphide are employed in molecular proportions in ratios lower than 3:5.

4. Process for the production of bis(chloromethyl) disulphide which comprises adding a member of the class consisting of sulphur monochloride and sulphuryl chloride to a solution of s-trithiane in bis(chloromethyl) monosulphide maintained at a temperature of 140 to 160° C., the molecular proportions of trithiane and chloride reactant being substantially in the ratio 2:3.

5. Process according to claim 4 wherein the chloride reactant and bis(chloromethyl) monosulphide are employed in molecular proportions in ratios of from 3:10 to 3:20.

6. Process for the production of bis(chloromethyl) disulphide which comprises adding gradually s-trithiane to a boiling solution of a member of the class consisting of sulphur monochloride and sulphuryl chloride in bis(chloromethyl) monosulphide, the molecular proportions of s-trithiane and chloride reactant being substantially in the ratio 2:3.

7. Process for the production of bis(chloromethyl) disulphide which comprises adding gradually s-trithiane in solution in bis(chloromethyl) monosulphide to a boiling solution of a member of the class consisting of sulphur monochloride and sulphuryl chloride in bis(chloromethyl) monosulphide, the molecular proportions of s-trithiane and chloride reactant being substantially in the ratio 2:3.

8. Process for the production of bis(chloromethyl) disulphide which comprises adding over a period of 7 to 45 minutes s-trithiane to a boiling solution of a member of the class consisting of sulphur monochloride and sulphuryl chloride in bis(chloromethyl) monosulphide, the molecular proportions of s-trithiane and chloride reactant being substantially in the ratio 2:3.

9. Process for the production of bis(chloromethyl) disulphide which comprises adding over a period of 7 to 45 minutes s-trithiane in solution in bis-(chloromethyl) monosulphide to a boiling solution of a member of the class consisting of sulphur monochloride and sulphuryl chloride in bis(chloromethyl) monosulphide, the molecular proportions of s-trithiane and chloride reactant being substantially in the ratio 2:3.

10. Process for the production of bis(chloromethyl) disulphide which comprises adding over a period of 7 to 45 minutes s-trithiane to a boiling solution of a member of the class consisting of sulphur monochloride and sulphuryl chloride in bis(chloromethyl) monosulphide, the molecular proportions of s-trithiane and chloride reactant being in the ratio 2:3, and the temperature is maintained at about 145° C. for a period up to 3 hours.

11. Process for the production of bis(chloromethyl) disulphide which comprises adding over a period of 7 to 45 minutes s-trithiane in solution in bis(chloromethyl) monosulphide to a boiling solution of a member of the class consisting of sulphur monochloride and sulphuryl chloride in bis(chloromethyl)monosulphide, the molecular proportions of s-trithiane and chloride reactant being in the ratio 2:3, and the temperature is maintained at about 145° C. for a period up to hours.

12. Process for the production of bis(chloromethyl) disulphide which comprises adding s-trithiane over a period of approximately 15 minutes to a boiling mixture of a member of the class consisting of sulphur monochloride and sulphuryl chloride and bis(chloromethyl) monosulphide in molecular proportions in the ratio of about 3:20, and the temperature of the reaction mixture is maintained at about the boiling point for approximately 1 hour, the molecular proportions of the trithiane and the chloride reactant being substantially in the ratio 2:3.

References Cited in the file of this patent

Davies et al.: Australian Journal of Chemistry 6, 152–155 (1953), Cited in Chemical Abstracts 48, 2584 (1954).